UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN SOLUTIONS FOR CHEMICAL TELEGRAPHS.

Specification forming part of Letters Patent No. 168,465, dated October 5, 1875; application filed January 15, 1875.

CASE 102.

*To all whom it may concern:*

Be it known that I, THOMAS A. EDISON, of Newark, in the county of Essex and State of New Jersey, have invented an Improvement in Automatic Telegraphic Solutions, of which the following is a specification:

I have found that if a colored salt of aniline, preferably rosaniline, known in commerce as magenta, which dissolves in water to a deep red, be treated with nitric acid, or, preferably, red fuming nitrous acid, it is oxidized to a nearly colorless solution. If a piece of paper is moistened in this solution and used in a chemical-telegraph recording-instrument, beautiful red marks are obtained when the positive pole of the battery is connected to the decomposing-pen, which is preferably of tin. The nascent oxygen in electrolysis combines with the tin pen to form protoxide of tin, which is a powerful reducing agent, and the colorless compound of oxidized rosaniline is decomposed, leaving it in its original state, viz., deep red. By the action of the air these marks soon become more apparent and of a deep violet. It is a very sensitive reaction, being as delicate as the iodide-of-potassium solution, but with the advantage of permanent marks and economy.

If an easily-decomposed chloride of any metal be added, the delicacy of the reaction is greatly increased, as the nascent chlorine, combining with the tin to form a protochloride, is a more powerful reducing agent than the protoxide. The delicacy of the reaction is still further increased by adding an organic acid, preferably oxalic.

A great number of the salts or compounds of aniline may be rendered colorless by oxidation and reduced to their original state, as set forth; but I prefer magenta, or rosaniline, on account of its superior coloring properties.

I claim as my invention—

A chemical solution for telegraphic paper containing aniline in a colorless, or nearly colorless, condition, substantially as set forth, in order that the mark may be made by electrolysis, as specified.

Signed by me this 14th day of August, A. D. 1875.

THOMAS A. EDISON.

Witnesses:
 GEO. T. PINCKNEY,
 CHAS. H. SMITH.